US009190090B1

(12) United States Patent
Zhang et al.

(10) Patent No.: US 9,190,090 B1
(45) Date of Patent: Nov. 17, 2015

(54) MULTI STEP LUBE BLOCKING AIR BEARING AREA CONFIGURATION

(71) Applicant: Western Digital (Fremont), LLC, Fremont, CA (US)

(72) Inventors: Shuyu Zhang, Fremont, CA (US); Lanshi Zheng, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/583,017

(22) Filed: Dec. 24, 2014

(51) Int. Cl.
*G11B 5/60* (2006.01)
*G11B 5/40* (2006.01)

(52) U.S. Cl.
CPC ............... *G11B 5/6082* (2013.01); *G11B 5/40* (2013.01)

(58) Field of Classification Search
CPC .......................................... G11B 5/60
USPC ...................................... 360/236.5
See application file for complete search history.

(56) References Cited

U.S. PATENT DOCUMENTS

| 5,490,025 | A | 2/1996 | Dorius et al. |
|---|---|---|---|
| 5,940,249 | A | 8/1999 | Hendriks |
| 6,075,673 | A | 6/2000 | Wilde et al. |
| 6,097,575 | A | 8/2000 | Trang et al. |
| 6,125,014 | A | 9/2000 | Riedlin, Jr. |
| 6,125,015 | A | 9/2000 | Carlson et al. |
| 6,130,863 | A | 10/2000 | Wang et al. |
| 6,137,656 | A | 10/2000 | Levi et al. |
| 6,144,528 | A | 11/2000 | Anaya-Dufresne et al. |
| 6,147,838 | A | 11/2000 | Chang et al. |
| 6,151,196 | A | 11/2000 | Carlson et al. |
| 6,178,064 | B1 | 1/2001 | Chang et al. |
| 6,181,522 | B1 | 1/2001 | Carlson |
| 6,181,673 | B1 | 1/2001 | Wilde et al. |
| 6,229,672 | B1 | 5/2001 | Lee et al. |
| 6,236,543 | B1 | 5/2001 | Han et al. |
| 6,246,547 | B1 | 6/2001 | Bozorgi et al. |
| 6,249,404 | B1 | 6/2001 | Doundakov et al. |
| 6,330,131 | B1 | 12/2001 | Nepela et al. |
| 6,339,518 | B1 | 1/2002 | Chang et al. |
| 6,349,017 | B1 | 2/2002 | Schott |
| 6,373,660 | B1 | 4/2002 | Lam et al. |
| 6,378,195 | B1 | 4/2002 | Carlson |
| 6,522,504 | B1 | 2/2003 | Casey |
| 6,538,850 | B1 | 3/2003 | Hadian et al. |
| 6,583,953 | B1 | 6/2003 | Han et al. |
| 6,594,113 | B2 | 7/2003 | Rao et al. |
| 6,646,832 | B2 | 11/2003 | Anaya-Dufresne et al. |
| 6,661,612 | B1 | 12/2003 | Peng |
| 6,665,146 | B2 | 12/2003 | Hawwa et al. |
| 6,690,545 | B1 | 2/2004 | Chang et al. |
| 6,704,173 | B1 | 3/2004 | Lam et al. |

(Continued)

OTHER PUBLICATIONS

Shuyu Zhang, et al., "Predicting Air Bearing Contamination Using Airflow Pattern Analysis," ASME Journal of Tribology, vol. 130, No. 1, Jan. 2008, pp. 011002-1-011002-4.

*Primary Examiner* — Mark Blouin

(57) ABSTRACT

A disk drive is provided having one or more structural air bearing surface (ABS) features that can block particulate matter, such as lube droplets that may enter the air bearing from the trailing edge or rearward portion of the slider. Moreover, such structural ABS features can influence air flow within or about the air bearing to prevent or at least reduce the accumulation of particles and/or droplets in one or more areas of the air bearing to reduce the reliability problems induced by particle contamination and lube pick-up.

20 Claims, 12 Drawing Sheets

(56) References Cited

U.S. PATENT DOCUMENTS

| | | |
|---|---|---|
| 6,708,389 B1 | 3/2004 | Carlson et al. |
| 6,717,773 B2 | 4/2004 | Hawwa et al. |
| 6,721,142 B1 | 4/2004 | Meyer et al. |
| 6,744,599 B1 | 6/2004 | Peng et al. |
| 6,771,468 B1 | 8/2004 | Levi et al. |
| 6,796,018 B1 | 9/2004 | Thornton |
| 6,801,402 B1 | 10/2004 | Subrahmanyam et al. |
| 6,856,489 B2 | 2/2005 | Hawwa et al. |
| 6,873,496 B1 | 3/2005 | Sun et al. |
| 6,879,464 B2 | 4/2005 | Sun et al. |
| 6,912,103 B1 | 6/2005 | Peng et al. |
| 6,920,015 B2 | 7/2005 | Mundt et al. |
| 6,937,439 B1 | 8/2005 | Chang et al. |
| 6,956,718 B1 | 10/2005 | Kulkarni et al. |
| 6,972,930 B1 | 12/2005 | Tang et al. |
| 6,980,399 B2 | 12/2005 | Rajakumar et al. |
| 7,006,330 B1 | 2/2006 | Subrahmanyam et al. |
| 7,006,331 B1 | 2/2006 | Subrahmanyam et al. |
| RE39,004 E | 3/2006 | Park et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,114 B2 | 8/2006 | Kang |
| 7,099,117 B1 | 8/2006 | Subrahmanyam et al. |
| 7,174,622 B2 | 2/2007 | Meyer et al. |
| 7,230,797 B1 | 6/2007 | Liu |
| 7,256,965 B2 | 8/2007 | Rao et al. |
| 7,289,299 B1 | 10/2007 | Sun et al. |
| 7,307,816 B1 | 12/2007 | Thornton et al. |
| 7,315,435 B1 | 1/2008 | Pan |
| 7,315,436 B1 | 1/2008 | Sanchez |
| 7,408,742 B2 | 8/2008 | Kameyama |
| 7,414,814 B1 | 8/2008 | Pan |
| 7,436,631 B1 | 10/2008 | Fanslau, Jr. et al. |
| 7,474,508 B1 | 1/2009 | Li et al. |
| 7,477,486 B1 | 1/2009 | Sun et al. |
| 7,525,763 B2 | 4/2009 | Yao et al. |
| 7,593,190 B1 | 9/2009 | Thornton et al. |
| 7,595,963 B1 | 9/2009 | Chen et al. |
| 7,616,405 B2 | 11/2009 | Hu et al. |
| 7,729,089 B1 | 6/2010 | Hogan |
| 7,916,426 B2 | 3/2011 | Hu et al. |
| 7,978,435 B2 | 7/2011 | Hanyu |
| 7,995,310 B1 | 8/2011 | Pan |
| 8,081,400 B1 | 12/2011 | Hu |
| 8,087,973 B1 | 1/2012 | Sladek et al. |
| 8,089,730 B1 | 1/2012 | Pan et al. |
| 8,094,411 B2 | 1/2012 | Huang et al. |
| 8,116,037 B2 * | 2/2012 | Kohira et al. ............... 360/235.7 |
| 8,164,858 B1 | 4/2012 | Moravec et al. |
| 8,184,405 B1 * | 5/2012 | Zheng et al. ............... 360/266.3 |
| 8,199,437 B1 | 6/2012 | Sun et al. |
| 8,208,224 B1 | 6/2012 | Teo et al. |
| 8,218,268 B1 | 7/2012 | Pan |
| 8,240,545 B1 | 8/2012 | Wang et al. |
| 8,256,272 B1 | 9/2012 | Roajanasiri et al. |
| 8,289,653 B2 * | 10/2012 | Huang ....................... 360/235.6 |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,343,363 B1 | 1/2013 | Pakpum et al. |
| 8,345,519 B1 | 1/2013 | Pan |
| 8,418,353 B1 | 4/2013 | Moravec et al. |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,462,462 B1 | 6/2013 | Moravec et al. |
| 8,477,459 B1 | 7/2013 | Pan |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,051 B1 | 12/2013 | Hanyu |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1 | 7/2014 | Wang et al. |
| 8,792,212 B1 | 7/2014 | Pan et al. |
| 8,792,213 B1 | 7/2014 | Vijay et al. |
| 8,797,691 B1 | 8/2014 | Tian et al. |
| 8,810,967 B2 | 8/2014 | Ramakrishnan et al. |
| 2003/0058578 A1 | 3/2003 | Boutaghou et al. |
| 2003/0165031 A1 | 9/2003 | Rajakumar |
| 2004/0012887 A1 | 1/2004 | Rajakumar et al. |
| 2004/0027724 A1 | 2/2004 | Pendray et al. |
| 2004/0150916 A1 | 8/2004 | Rao et al. |
| 2004/0156143 A1 | 8/2004 | Kang |
| 2005/0105216 A1 | 5/2005 | Ueno et al. |
| 2007/0103816 A1 | 5/2007 | Nakakita et al. |
| 2007/0195461 A1 | 8/2007 | Kajitani |
| 2011/0195275 A1 | 8/2011 | Huha et al. |
| 2013/0244541 A1 | 9/2013 | Yaemglin et al. |
| 2013/0293982 A1 | 11/2013 | Huber |

* cited by examiner

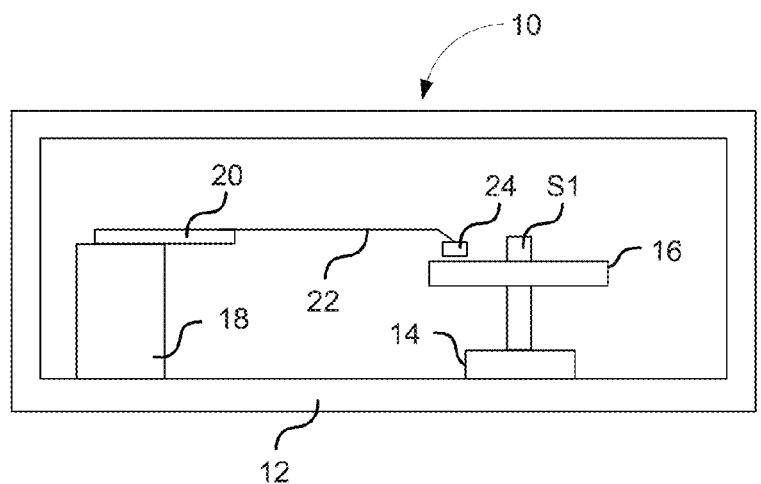
FIG. 1A
(Conventional)
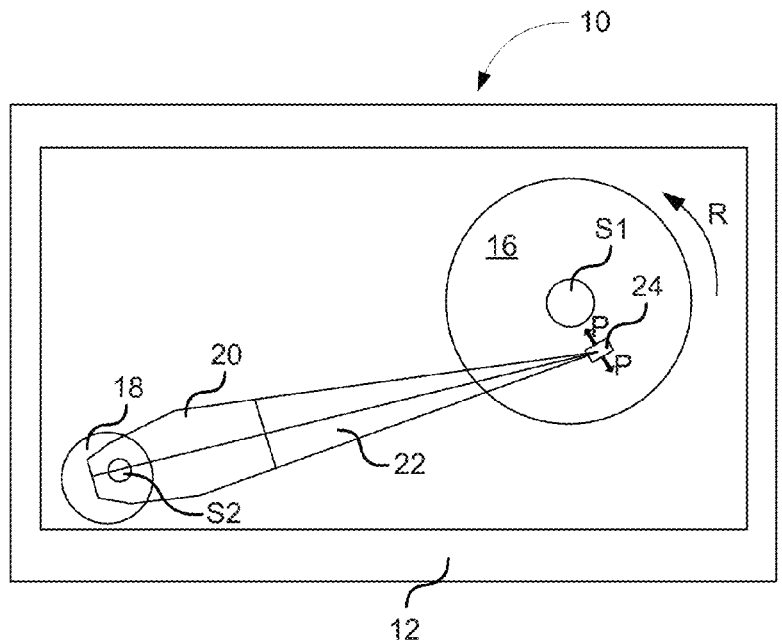
FIG. 1B
(Conventional)

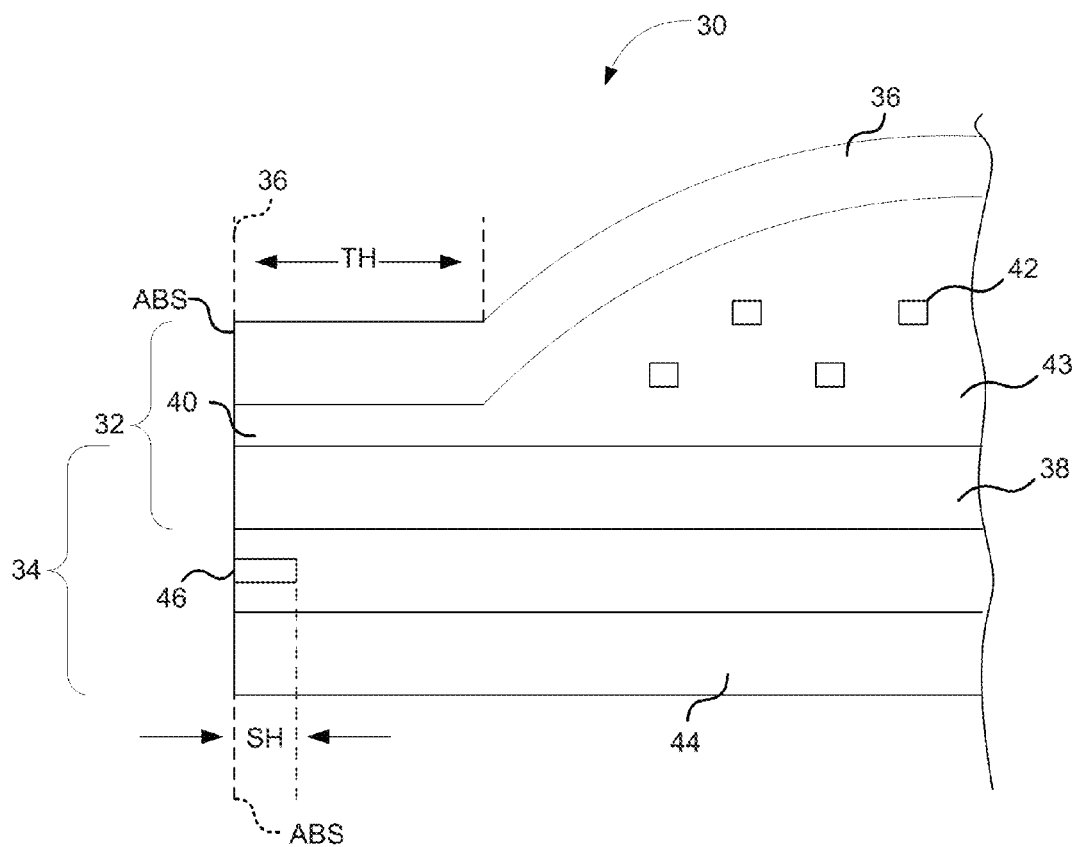
FIG. 1C
(Conventional)

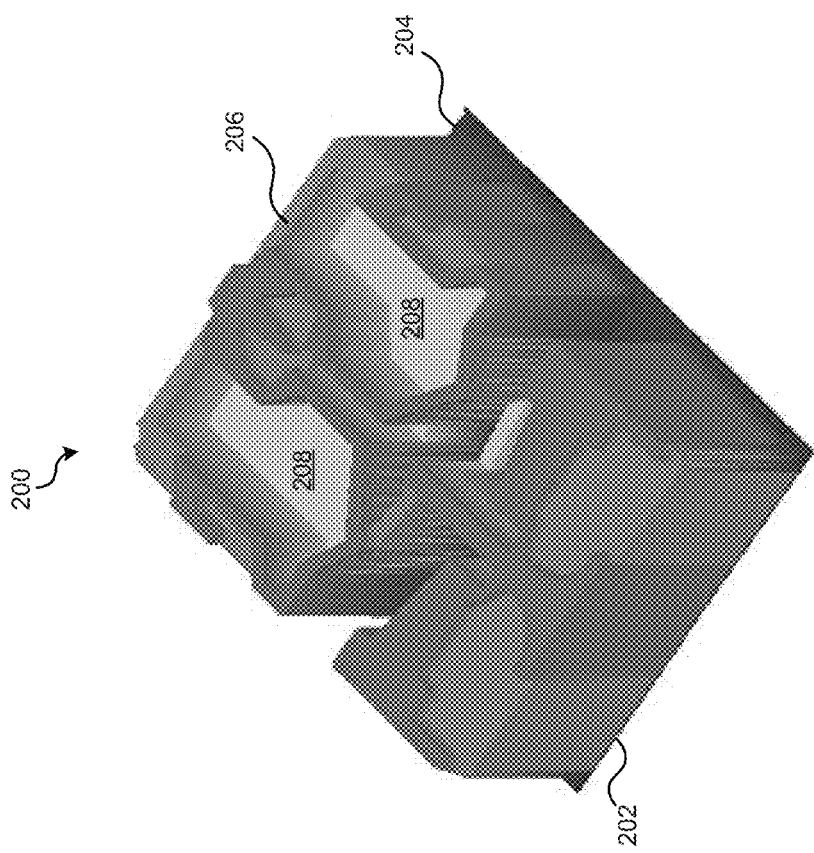
FIG. 2A
(Conventional)

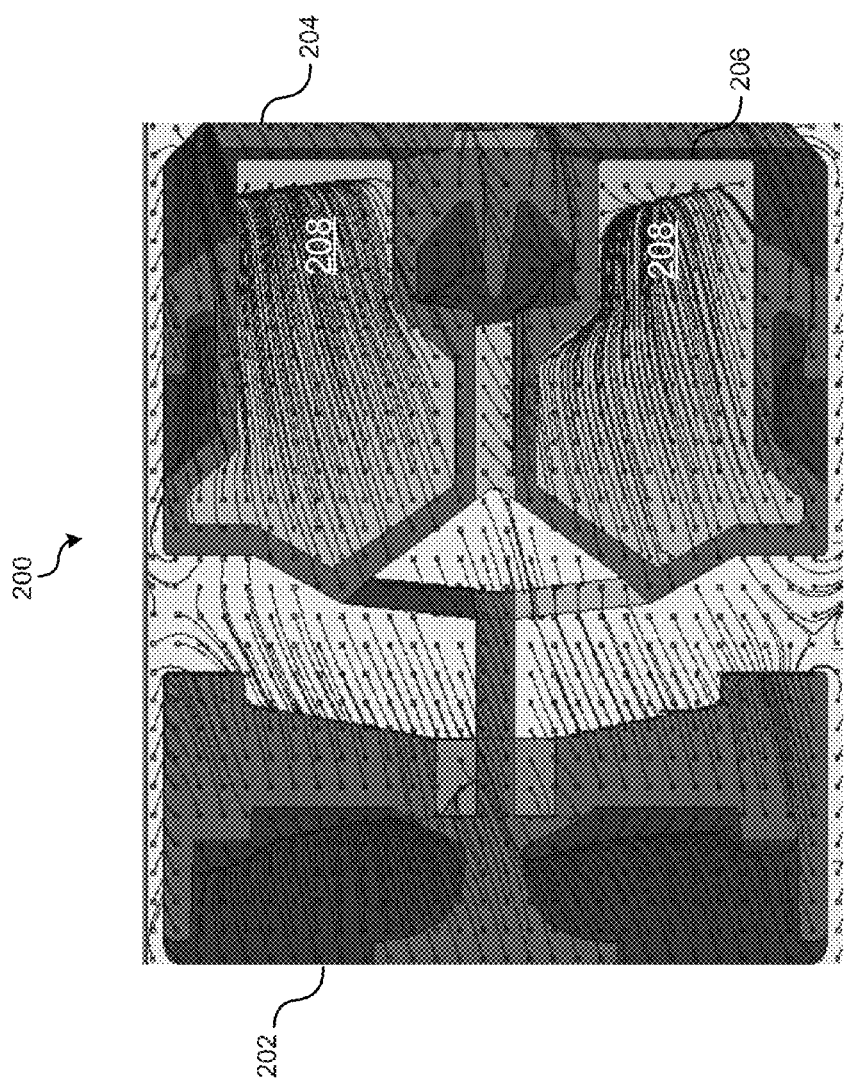
FIG. 2B
(Conventional)

MULTI STEP LUBE BLOCKING AIR BEARING AREA CONFIGURATION

BACKGROUND

In magnetic storage devices such as hard disk drives (HDD), read and write heads are used to magnetically read and write information to and from the storage media. In an HDD, data is stored on one or more disks in a series of adjacent concentric circles. An HDD comprises a rotary actuator, a suspension mounted on an arm of the rotary actuator, and a slider bonded to the suspension to form a head gimbal assembly. In a traditional HDD, the slider carries a read/write head, and radially floats over the recording surface of the disk under the control of a servo control system that selectively position the head over a specific track of the disk.

BRIEF DESCRIPTION OF THE DRAWINGS

Various embodiments are illustrated by way of example, and not limitation, in the figures of the accompanying drawings in which:

FIGS. 1A and 1B illustrate an example of a conventional magnetic disk drive in which a magnetic read element manufactured in accordance with various embodiments may be utilized;

FIG. 1C illustrates an example of a conventional read/write head;

FIG. 2A illustrates a bottom view of an example magnetic read/write head configured with a conventional single step lubricant barrier;

FIG. 2B illustrates an example of air flow stagnation resulting from the conventional single step lubricant barrier configuration of FIG. 2A.

DETAILED DESCRIPTION

Figure 3A:
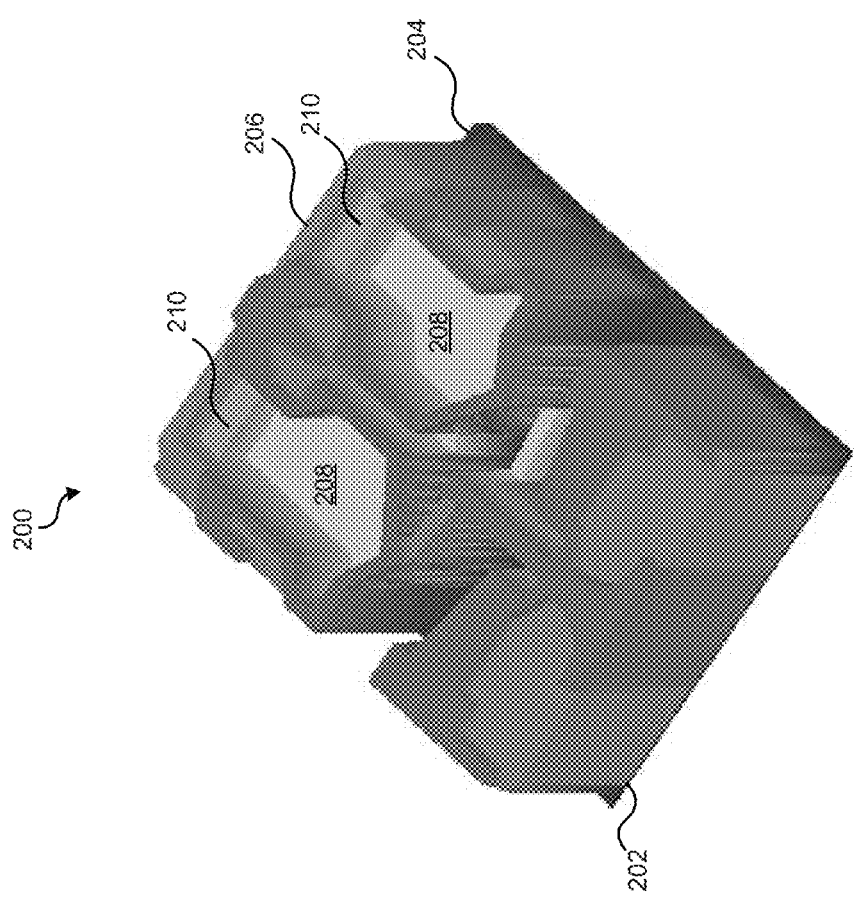
FIG. 3A illustrates a bottom view of an example magnetic read/write head configured with a multi-step lubricant barrier in accordance with one embodiment of the present disclosure.

In the following description, numerous specific details are set forth to provide a thorough understanding of various embodiments of the present disclosure. It will be apparent to one skilled in the art, however, that these specific details need not be employed to practice various embodiments of the present disclosure. In other instances, well known components or methods have not been described in detail to avoid unnecessarily obscuring various embodiments of the present disclosure.

As described above, magnetic storage devices such as HDDs use magnetic media to store data and a movable slider having magnetic transducers positioned over the magnetic media to selectively read data from and write data to the magnetic media. The movable slider and magnetic transducers may be a sub-component of a head gimbal assembly (HGA). A magnetic transducer typically comprises a magneto-resistive read element (e.g., a so-called giant magneto-resistive read element, or a tunneling magneto-resistive read element) and an inductive write structure comprising a flat coil deposited by photolithography and a yoke structure having pole tips that face a disk media.

FIGS. 1A and 1B illustrate an example magnetic disk drive 10 that can include a sealed enclosure 12, a disk drive motor 14, a magnetic disk 16, supported for rotation by a spindle S1 of motor 14, an actuator 18 and an arm 20 attached to a spindle S2 of actuator 18. Suspension 22 is coupled at one end to arm 20, and at its other end to a read/write head or transducer 24. Transducer 24 typically includes an inductive write element with a magneto-resistive read element (shown in FIG. 1C). As motor 14 rotates magnetic disk 16, as indicated by arrow R, an air bearing is formed between an air bearing surface (ABS) of transducer 24 and a surface of magnetic disk 16 causing transducer 24 to lift slightly off of the surface of magnetic disk 16, or, as it is termed in the art, to "fly" above magnetic disk 16. Various magnetic "tracks" of information can be read from magnetic disk 16 as actuator 18 causes transducer 24 to pivot in a short arc as indicated by arrows P.

FIG. 1C illustrates a magnetic read/write head 30 including a write element 32 and read element 34. The edges of write element 32 and read element 34 also define an ABS in a plane which flies above the surface of the magnetic disk 16 during operation.

Read element 34 includes a first shield 44, an intermediate layer 38 which serves as a second shield, and a read sensor 46 located between the first shield 44 and the intermediate layer 38. Read sensor 46 has a particular stripe height and a particular location between the first shield 44 and the second shield 38, both of which are chosen to attain a particular read performance. Control of stripe height is important in controlling device resistance, device output amplitude, device bias point and consequently many related measures of performance. Magneto-resistive sensors can be used with a variety of stripe heights, with a typical stripe height being smaller than about 2 microns, including much less than 1 micron. Further, although read sensor 46 is shown in FIG. 1C as a shielded single-element vertical read sensor, read element 34 can take a variety of forms as is known to those skilled in the art, such as unshielded read sensors.

Write element 32 is typically an inductive write element including the intermediate layer 38 which serves as a first yoke element or pole, and a second yoke element or pole 36, defining a write gap 40 therebetween. First yoke element 38 and second yoke element 36 are configured and arranged relative to each other such that the write gap 40 has a particular nose length, NL. Also included in write element 32, is a conductive coil 42 that is positioned within a dielectric medium 43. As is well known to those skilled in the art, these elements operate to magnetically write data on a magnetic medium such as a magnetic disk 16.

The flying height (FH), which can refer to the aforementioned air bearing space between media (e.g., magnetic disk 16) and the magnetic read/write head 30 (of a transducer) on a slider, is a key parameter that affects the performance of a magnetic storage device. Accordingly, a nominal FH is typically chosen to be a careful compromise between extremes in a classic engineering "trade-off". Decreasing the FH is advantageous because an FH that is too high degrades the ability of the transducer to write and/or read information to/from the surface of the media/disk surface. Therefore, reductions in FH can facilitate desirable increases in the areal density of data stored on a disk surface. However, the air bearing between the slider and the disk surface cannot be eliminated entirely because the air bearing serves to reduce friction and wear (between the slider and the disk surface) to an acceptable level.

Because of the desire to reduce FH, the air bearing between the media and magnetic read/write head is quite thin and therefore, very susceptible to unwanted effects resulting from the introduction of any type of contaminate, such as particulate matter/particles and lubricant (lube) droplets or particles that can become trapped in the air bearing. For example, a magnetic read/write head can be mounted on a slider that flies a mere 10 nm (an approximate example) over the media. Any particulate matter that accumulates by being trapped within this very thin air bearing can create a variety of problems including, but not limited to the following: abrasive wear on the media/disk surface; magnetic spacing modulation; unstable flying conditions; and in extreme cases, crashing of the slider onto the media/disk surface.

Thus, one challenge that disk drive engineers face involves removing or preventing the entry of any particulate matter that is introduced into the air bearing so as to constantly maintain the desired nominal FH and reduce the risk of any particle-caused failures. Certain methods that have been developed in an attempt to reduce contamination in the air bearing have been directed at "blocking" particles from entering the air bearing, such as using a fence at a leading edge of the slider to block particles from entering the air bearing. Other methods include a particle trap design using deep pits in the leading area of the slider to trap particles that have already entered the air bearing. Still other methods rely on a lube blocker design, where a fence blocks lubricant droplets from entering the air bearing from the trailing edge of the slider.

However, the aforementioned methods can have a negative impact on the performance of the HDD due to incoming air flow that can also be blocked or trapped using such structures. That is, the aforementioned conventional methods of particle/droplet contamination prevention introduce air flow stagnation in one or more etched cavities within the slider. It is within these cavities that particles and droplets often accumulate. Therefore, stagnant air flow (or the lack of air flow) in these areas can exacerbate or even cause these contaminant accumulation problems.

Accordingly, various embodiments of the present disclosure are directed to one or more structural ABS features that can block particulate matter, such as lube droplets that may enter the air bearing from the trailing edge or rearward portion of the slider. Moreover, such structural ABS features can influence air flow within or about the air bearing to prevent or at least reduce the accumulation of particles and/or droplets in one or more areas of the air bearing to reduce the reliability problems induced by particle contamination and lube pickup. It should be noted that in modern ABS design, one or more cavities are etched in the rear portion of the slider, close to the central pad of the slider.

FIG. 2A is a bottom view of an example slider 200 configured with a conventional lube blocker structure. Slider 200 may have a leading edge 202 and a trailing edge 204. The bottom surface of slider 200 makes up an ABS, where the various shaded areas of the bottom surface of slider 200 are indicative of areas that have been etched at various depths resulting in different cavities, steps, and/or pads, one of which is cavity 208 (which can be etched to a depth of 1 µm relative to the ABS of slider 200). In this example, a conventional lube blocker 206 is implemented to block, e.g., lube droplets from entering the air bearing from rear or trailing edge 204 of slider 200. Conventional lube blocker 206 may have a depth of 0.2 µm. It should be noted that depth measurements provided herein refer to depth, e.g., of a cavity or other etched surface or area relative to the lowest surface of the slider. As would be understood by those of ordinary skill in the art, the lowest surface of a slider that flies over a recording medium is that which is nearest the recording medium. In other words, FIG. 2A (in addition to other representations of a slider) illustrates bottom views that are upside down.

FIG. 2B illustrates air flow patterns within or about the ABS of slider 200. As shown in FIG. 2B, lube blocker 206 may have the ability to block some amount of lube droplets from entering cavity 208. However, air flow becomes stagnant in cavity 208 (proximate to lube blocker 206) resulting in the accumulation of any lube droplets or particulate matter in cavity 208. It should be noted that the blocking 100% of particles and/or droplets from entering the air bearing of a slider is near impossible, if not entirely impossible. Accordingly, some particles and/or droplets will find their way to the air bearing of slider 200. Without airflow in those areas where particles and/or droplets accumulate, such as cavity 208, the particles and/or droplets will remain and can result in one or more of the aforementioned issues.

In accordance with various embodiments, areas of airflow stagnation can be eliminated by the use of multi-step lube blocking structures. Such multi-step lube block structures can provide a "stepped" progression (with one or more steps or ledges) from a lube blocker structure into a cavity area proximate to the trailing edge of a slider. The number of steps or ledges may vary in accordance with different embodiments, but the number of steps or ledges may generally be a function of the depth of the cavity in which they are implemented. That is, the deeper the cavity, the more steps or ledges may be needed to maintain air movement in the cavity. For example, a cavity depth of approximately 2 µm or less may correspond to the use of a maximum of three steps. Moreover, the change in depth between adjacent steps or ledges is generally smaller than approximately 0.5 µm. Further still, an in accordance with various embodiments, the width of such steps or ledges may be approximately 15-40 µm, and in some applications, smaller steps or ledges may be preferable, while still remaining within any manufacturing thresholds.

It should be noted that sliders may have varying dimensions. For example, a "Pemto" type slider design may generally refer to a slider having the following dimensions: approximately 1.25 mm long, approximately 0.7 mm wide, and approximately 0.23 mm thick, although some manufacturers due to particular manufacturing requirements may configure a Pemto type slider to be, e.g., approximately 1.35 mm long. A "Femto" type slider may generally refer to a slider having the following dimensions: approximately 0.85 mm long, approximately 0.7 mm wide, and approximately 0.23 mm thick. In accordance with one example, slider 200 may be a Pemto type ABS slider design, where the length of slider 200 is approximately 1.253 mm, the width is approximately 0.7 mm, and the thickness at its largest (shallowest etched area(s)) is approximately 0.23 mm. In accordance with another example, slider 200 may be a Femto type ABS slider design, where one or more dimensions of slider 200 and/or one or more elements of slider 200 may be decreased. For example, and as discussed above, the length of a Femto type ABS slider configured in accordance with another example may be about 0.85 mm, the width may be about 0.7 mm, and the thickness at its largest (shallowest etched area(s)) may be about 0.23 mm.

Figure 3B:
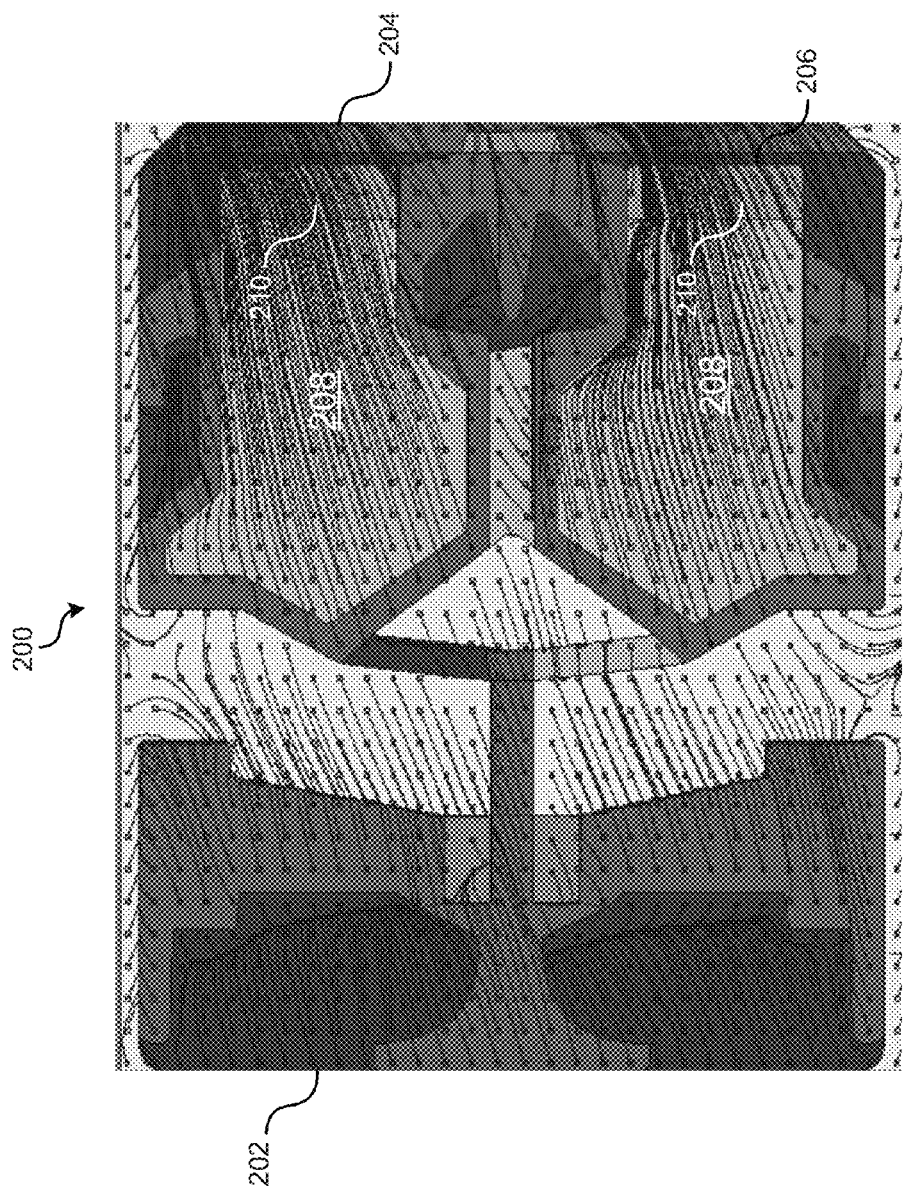
FIG. 3B illustrates an example of air flow resulting from the multi-step lubricant barrier configuration of FIG. 3A.

FIGS. 3A and 3B illustrate an example of a multi-step lube blocking structure and air flow patterns, respectively, in the air bearing of slider 200.

FIG. 3A illustrates slider 200 having a leading edge 202 and trailing edge 204. Slider 200 may be configured with an etched cavity 208. Proximate to trailing edge 204 is a lube blocker structure 206. A step 210 may be etched substantially proximate to or abutting a side of lube blocker structure 206 on the side of cavity 208. Accordingly, from trailing edge 204, there is a stepped structure including lube blocker structure 206 and step 210 leading to cavity 208. In accordance with this embodiment, cavity 208 may have a depth of approximately 1 μm, lube blocker structure 206 may have a depth of 0.2 μm, and step 210 may be etched to a depth of 0.55 μm.

FIG. 3B illustrates air flow patterns in the ABS of slider 200. It can be appreciated that with the introduction of step 210, airflow is no longer stagnant in cavity 208. Rather, it can be appreciated that any particles or lube droplets that may reach the air bearing of slider 200 will be flushed away from or out of cavity 208.

Figure 4A:
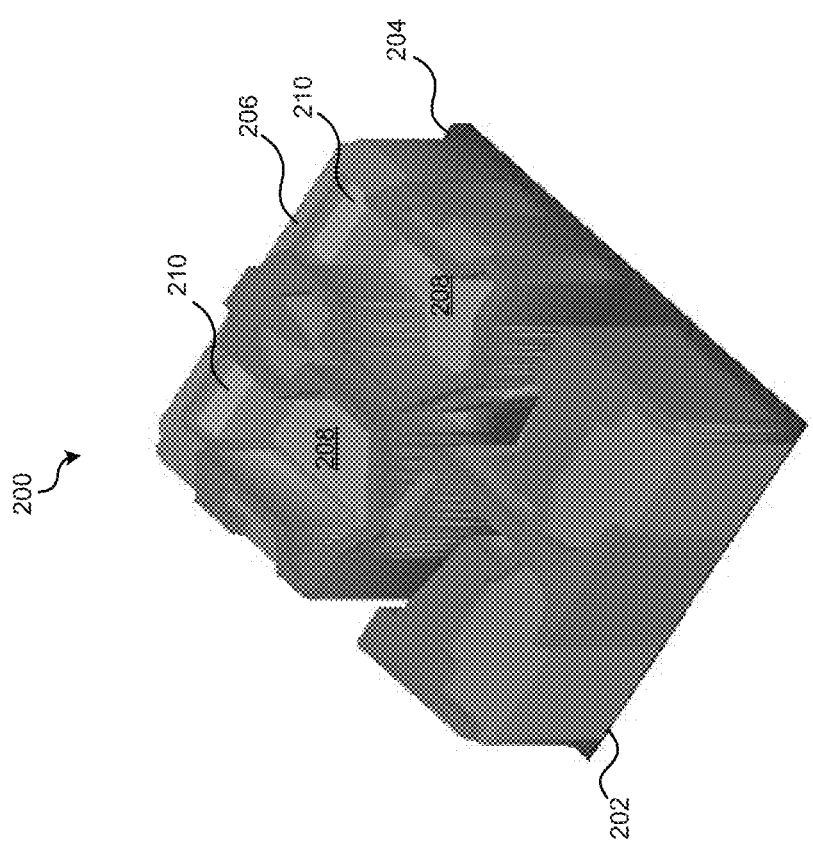
FIG. 4A illustrates a bottom view of an example magnetic read/write head configured with a multi-step lubricant barrier in accordance with another embodiment of the present disclosure.
Figure 4B:
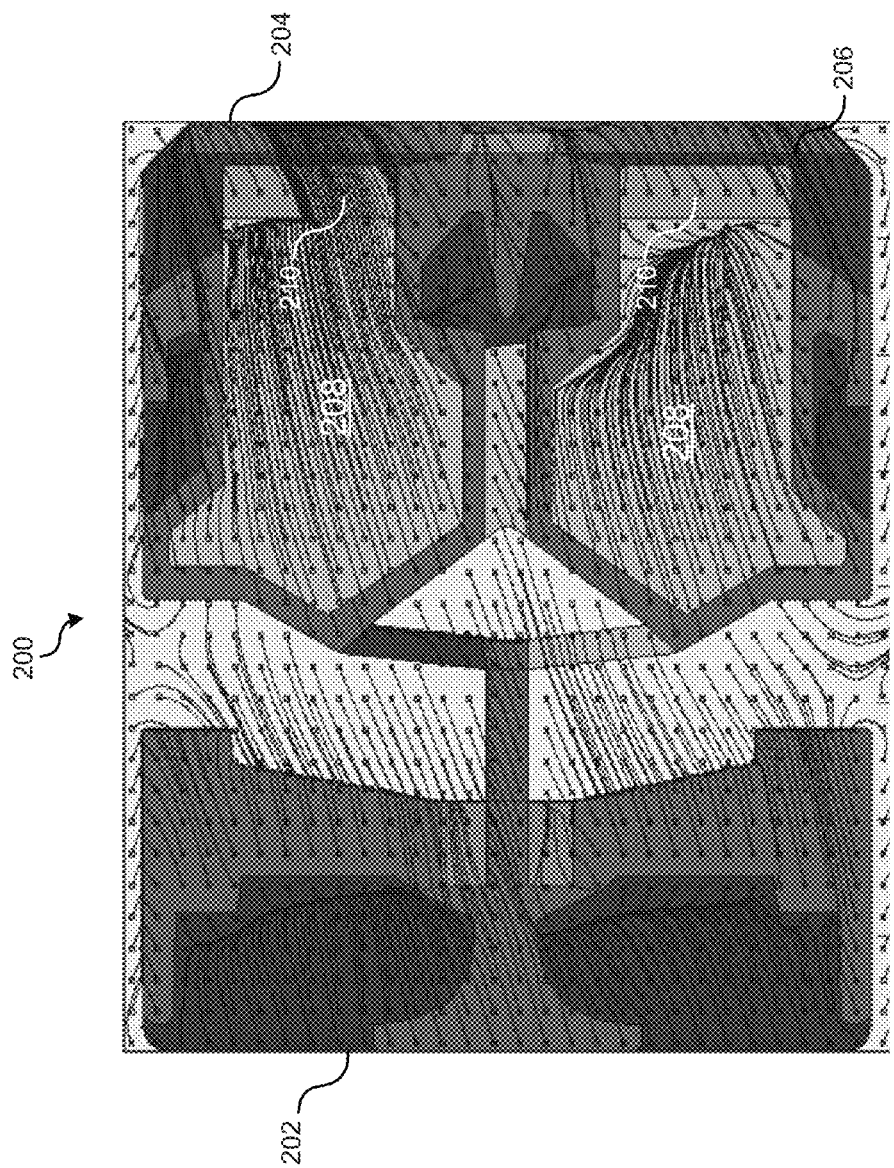
FIG. 4B illustrates an example of air flow resulting from the multi-step lubricant barrier configuration of FIG. 4A.

FIGS. 4A and 4B illustrate an example of a multi-step lube blocking structure and airflow patterns, respectively, in the air bearing of slider 200.

FIG. 4A again illustrates slider 200 having a leading edge 202 and trailing edge 204. Slider 200 may be configured with an etched cavity 208. Proximate to trailing edge 204 is a lube blocker structure 206. A step 210 may be etched substantially proximate to or abutting a side of lube blocker structure 206 on the side of cavity 208. Accordingly, from trailing edge 204, there is a stepped structure including lube blocker structure 206 and step 210 leading to cavity 208. In accordance with this embodiment, cavity 208 may have a depth of approximately 1.5 μm, lube blocker structure 206 may have a depth of 0.2 μm, and step 210 may be etched to a depth of 0.55 μm.

FIG. 4B illustrates air flow patterns in the ABS of slider 200. It can be appreciated that with the introduction of step 210, stagnation in airflow is improved compared to that experienced using a conventional lube blocker structure without any steps/ledges. However, some amount of stagnation reappears in cavity 208 due to the increase in depth of cavity 208.

Figure 5A:
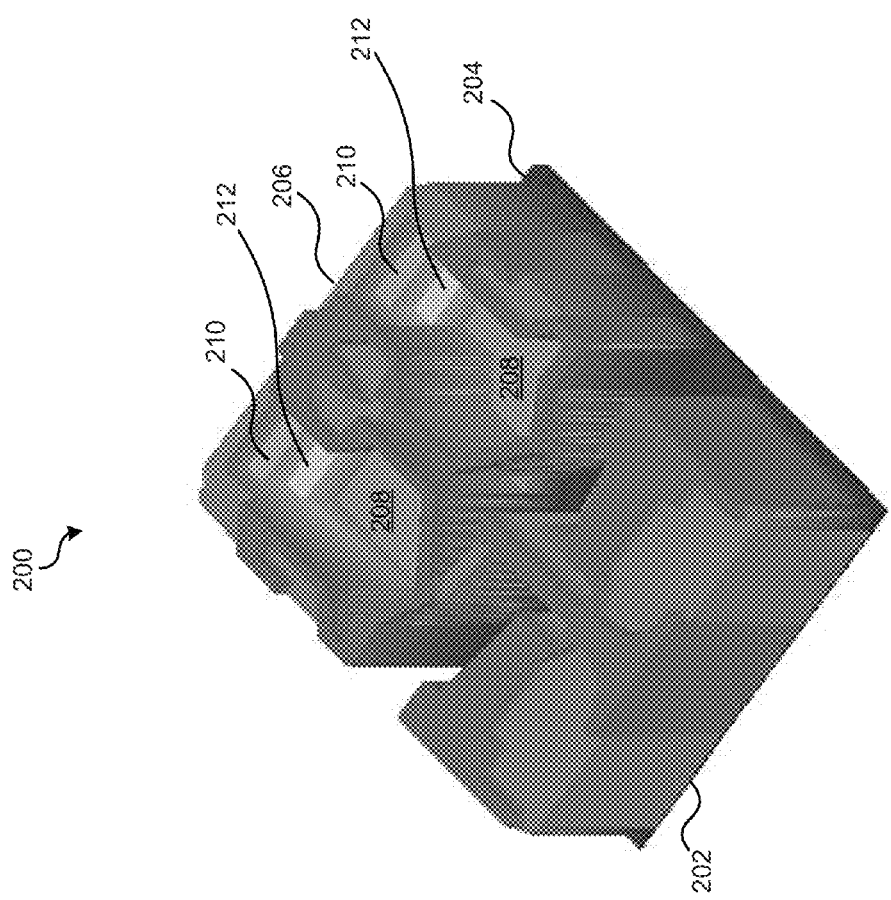
FIG. 5A illustrates a bottom view of an example magnetic read/write head configured with a multi-step lubricant barrier in accordance with still another embodiment of the present disclosure.
Figure 5B:
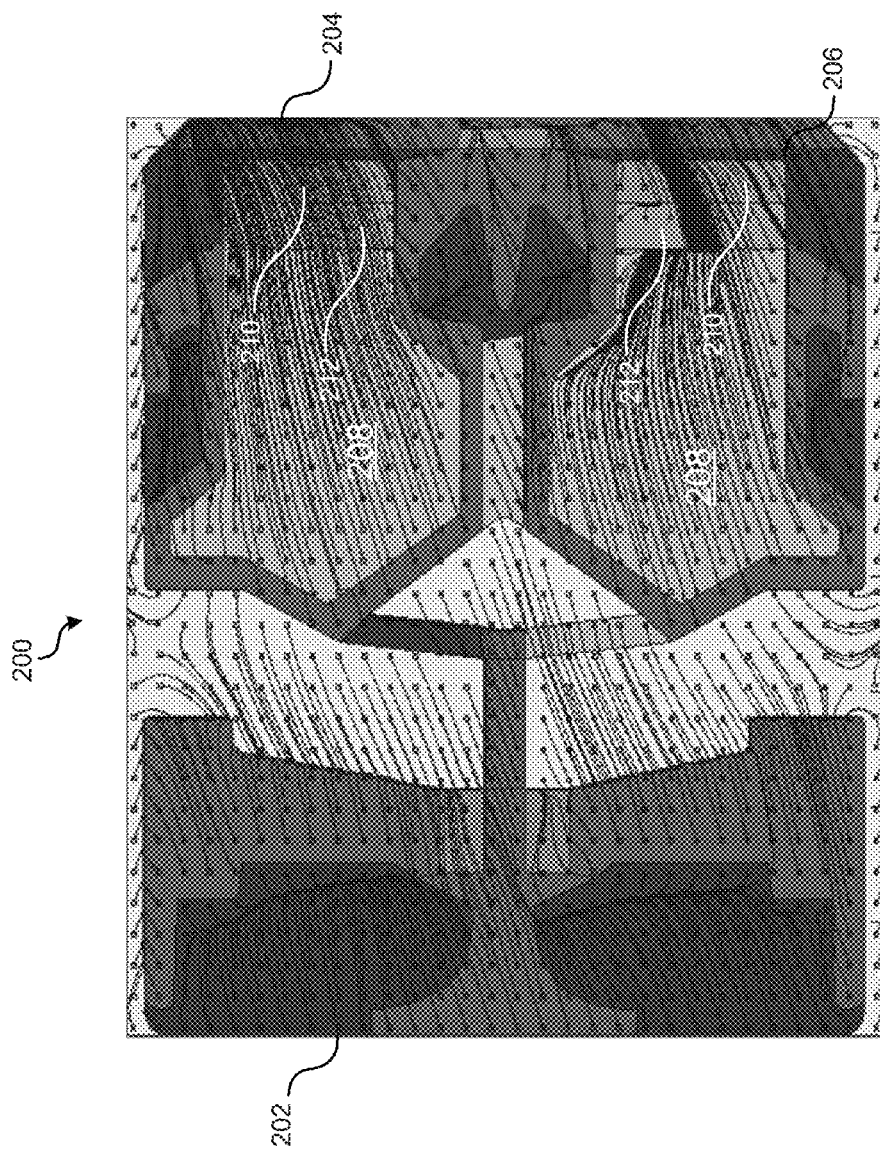
FIG. 5B illustrates an example of air flow resulting from the multi-step lubricant barrier configuration of FIG. 5A.

Accordingly, FIGS. 5A and 5B illustrate another multi-step lube blocking structure and airflow patterns, respectively, that can be applied to sliders having deeper cavities, such as that illustrated in FIGS. 4A and 4B.

In the example of FIG. 5A, slider 200 has a leading edge 202 and trailing edge 204. Slider 200 may be configured with an etched cavity 208. Proximate to trailing edge 204 is a lube blocker structure 206. A first step 210 may be etched substantially proximate to or abutting a side of lube blocker structure 206 on the side of cavity 208. Still another second step 212 can be etched substantially proximate to or abutting a side of first step 210 on the side of cavity 208. Accordingly, from trailing edge 204, there is a stepped structure including lube blocker structure 206, first step 210, and second step 212 leading to cavity 208. In accordance with this embodiment, cavity 208 may have a depth of approximately 1.5 μm, lube blocker structure 206 may have a depth of approximately 0.2 μm, first step 210 may be etched to a depth of approximately 0.55 μm, and second step 212 may be etched to a depth of approximately 1.0 μm.

FIG. 5B illustrates air flow patterns in the ABS of slider 200. It can be appreciated that airflow is further improved within or about the ABS at cavity 208. That is, a first side of cavity 208 shows no stagnation of airflow, while a second side of cavity 208 shows only minimal stagnation of airflow at second step 212.

Figure 6A:
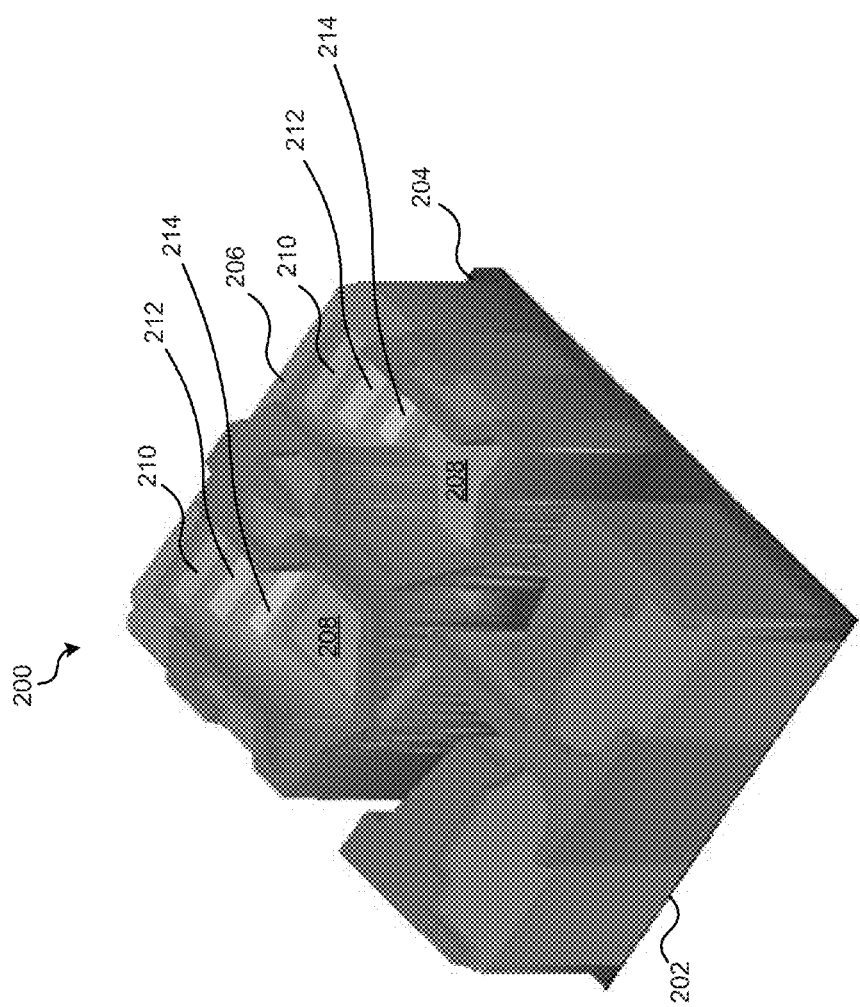
FIG. 6A illustrates a bottom view of an example magnetic read/write head configured with a multi-step lubricant barrier in accordance with yet another embodiment of the present disclosure.
Figure 6B:
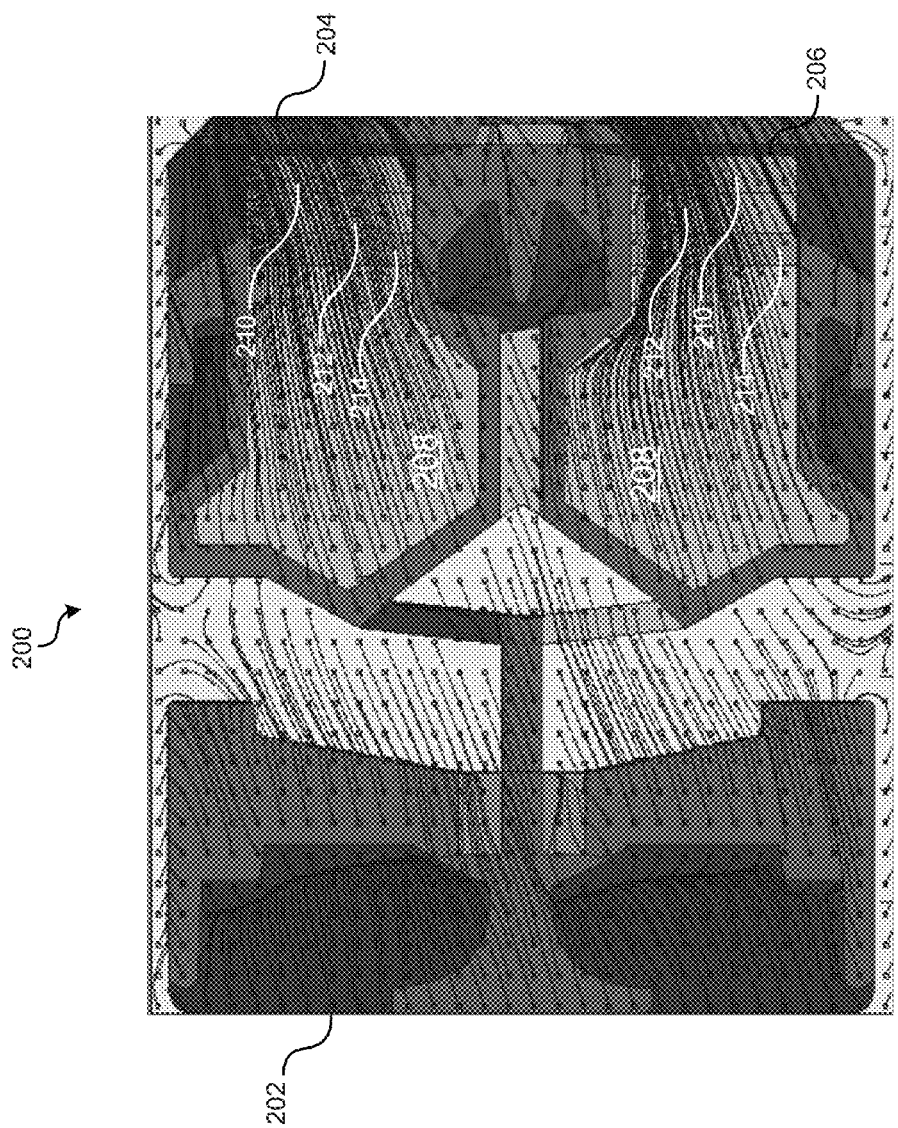
FIG. 6B illustrates an example of air flow resulting from the multi-step lubricant barrier configuration of FIG. 6A.

FIGS. 6A and 6B illustrate still another multi-step lube blocking structure and airflow patterns, respectively that can be applied to sliders having deeper cavities, such as that illustrated in FIGS. 4A and 4B.

In the example of FIG. 6A, slider 200 has a leading edge 202 and trailing edge 204. Slider 200 may be configured with an etched cavity 208. Proximate to trailing edge 204 is a lube blocker structure 206. A first step 210 may be etched substantially proximate to or abutting a side of lube blocker structure 206 on the side of cavity 208. A second step 212 can be etched substantially proximate to or abutting a side of first step 210 on the side of cavity 208. Additionally still, a third step 214 can be etched substantially proximate to or abutting a side of second step 212 on the side of cavity 208. Accordingly, from trailing edge 204, there is a stepped structure including lube blocker structure 206, first step 210, second step 212, and third step 214 leading to cavity 208. In accordance with this embodiment, cavity 208 may have a depth of approximately 1.5 μm, lube blocker structure 206 may have a depth of approximately 0.2 μm, first step 210 may be etched to a depth of approximately 0.5 μm, second step 212 may be etched to a depth of approximately 0.8 μm, and third step 214 may be etched to a depth of approximately 1.15 μm.

FIG. 6B illustrates air flow patterns in the ABS of slider 200. It can be appreciated that airflow is improved yet again within or about the ABS at cavity 208, where airflow stagnation is substantially eliminated in cavity 208. Thus, that any particles or lube droplets that may reach the air bearing of slider 200 will be flushed away from or out of cavity 208.

Various embodiments provide an easy and convenient mechanism that allows ABS designers to avoid the problems associated with particle and/or lubricant contamination. In particular, various multi-step lube blocking structures can be implemented on a slider to not only reduce the introduction of particulate matter/droplets into the air bearing, but also promote airflow in areas where particulate matter/droplets that are not prevented from entering the air bearing can still be flushed away. Because the aforementioned structure ABS features eliminate or at least reduce the opportunity for particles and lubricant to interact with the ABS, that chance for failure of the HDD and/or damage caused by the particles and/or lubricant is also eliminated or at least reduced. It should be noted that although various embodiments disclosed herein have been described in the context of magnetic recording media, various embodiments can be adapted for use with other forms of media, e.g., magneto-optical disks, optical disks, etc.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration. Moreover, the dimensions in these diagrams and illustrations are not necessarily drawn to scale.

What is claimed is:

1. A slider, comprising:
   a leading edge and a trailing edge;
   a transducer proximate to the trailing edge for performing read and write operations on a recording medium;
   a cavity configured between the leading edge and the trailing edge;
   a blocking structure proximate and parallel to the trailing edge configured to block contaminating lubrication matter from the trailing edge; and
   a first ledge positioned proximate and parallel to the blocking structure between the cavity and the blocking structure.

2. The slider of claim 1, wherein the slider is one of a pemto type slider or a femto type slider.

3. The slider of claim 1, wherein the blocking structure has a first height relative to an air bearing surface of the slider.

4. The slider of claim 3, wherein the first height is approximately 0.2 μm.

5. The slider of claim 3, wherein the first ledge has a second height lower than the first height of the blocking structure relative to the air bearing surface of the slider.

6. The slider of claim 5, wherein the second height is approximately 0.55 μm.

7. The slider of claim 5, wherein the cavity has a third height lower than second height of the first ledge relative to the air bearing surface of the slider.

8. The slider of claim 7, wherein the third height comprises a range between approximately 1 μm to 1.5 μm.

9. The slider of claim 8, further comprising a second ledge positioned proximate to the first ledge between the cavity and the first ledge.

10. The slider of claim 9, wherein the second ledge has a fourth height of approximately 1.0 μm relative to the air bearing surface of the slider.

11. The slider of claim 1, further comprising at least two additional ledges configured to create a stepped configuration between the cavity and the blocking structure.

12. The slider of claim 11, wherein one of the at least two additional ledges is further than another one of the at least two additional ledges from an air bearing surface of the slider, and wherein both of the at least two additional ledges are further from the air bearing surface of the slider than the first ledge.

13. The slider of claim 12, wherein the cavity is 1.5 μm from the air bearing surface of the slider, the blocking structure is 0.2 μm from the air bearing surface of the slider, the first ledge is 0.5 μm from the air bearing surface, the one of the at least two additional ledges is 0.8 μm above the air bearing surface, and the other of the at least two additional ledges is 1.15 μm above the air bearing surface.

14. A disk drive, comprising:
   a rotatable recording medium;
   a longitudinal slider having a leading edge and a trailing edge, a bottom surface of the longitudinal slider proximate to the rotatable recording medium defining an air bearing surface;
   a transducer proximate to the trailing edge for performing read and write operations on the rotatable recording medium;
   a cavity disposed between the leading edge and the trailing edge;
   a lubricant blocking structure disposed proximate and parallel to the trailing edge between the cavity and the trailing edge; and
   a first ledge disposed between the cavity and the lubricant blocking structure configured to promote air flow through the cavity, preventing lubricant material collection within the cavity.

15. The disk drive of claim 14, wherein the cavity is between approximately 1.0 μm and 1.5 μm from the air bearing surface.

16. The disk drive of claim 15, wherein the lubricant blocking structure is approximately 0.2 μm from the air bearing surface.

17. The disk drive of claim 16, further comprising a second ledge disposed between the first ledge and the cavity.

18. The disk drive of claim 17, further comprising a third ledge disposed between the second ledge and the cavity.

19. The disk drive of claim 18, wherein the first ledge is approximately 0.5 μm from the air bearing surface, the second ledge is approximately 0.8 μm from the air bearing surface, and the third ledge is approximately 1.15 μm from the air bearing surface.

20. The disk drive of claim 16, wherein the first ledge is approximately 0.55 μm from the air bearing surface, and wherein the second ledge is approximately 1.0 μm from the air bearing surface.

* * * * *